United States Patent [19]

Postl

[11] Patent Number: 4,786,975
[45] Date of Patent: Nov. 22, 1988

[54] METHOD FOR CODING FACSIMILES

[75] Inventor: Wolfgang Postl, Berg, Fed. Rep. of Germany

[73] Assignee: Siemens Aktiengesellschaft, Berlin and Munich, Fed. Rep. of Germany

[21] Appl. No.: 147,665

[22] Filed: Jan. 25, 1988

Related U.S. Application Data

[63] Continuation of Ser. No. 36,188, Apr. 9, 1987, abandoned.

[30] Foreign Application Priority Data

Apr. 27, 1984 [DE] Fed. Rep. of Germany ....... 3415763

[51] Int. Cl.⁴ .............................................. H04N 1/40
[52] U.S. Cl. ..................................... 358/283; 358/298
[58] Field of Search ....................... 358/283, 280, 298; 382/50, 56, 9; 364/523

[56] References Cited

U.S. PATENT DOCUMENTS 4,122,496 10/1978 Childress et al. ................... 358/283
4,194,221  3/1980 Stoffel ................................. 358/283
4,447,830  5/1984 Stoffel ................................. 358/283
4,547,812 10/1985 Waller ................................. 358/283

FOREIGN PATENT DOCUMENTS 3024322  1/1982 Fed. Rep. of Germany .

OTHER PUBLICATIONS

CCITT, "Specifications of Signalling System No. 7", 11-10-80.
CCITT, "Draft Reccommendation", Group 4, Fascimile Apparatus, 5-24-83.
1984 Intl. Zurich Seminar on Digital Communications, "Applications of Source Coding Channel Coding and Secrecy Coding", 3-6-84.
Postl; Wolfgang, "Halftone Recognition by an Experimental Text and Facsimile Workstation", IEEE, 1982, Jun. 16.

Primary Examiner—Edward L. Coles, Sr.

[57] ABSTRACT

A method for coding facsimiles which are acquired when scanning originals containing halftone areas. In order to eliminate moire and/or for the purpose of a data compression, a coding of the halftone areas corresponding to an unsharper imaging in comparison to the original is executed such that the so-called halftone raster is suppressed. The method provides that a detail area is defined with a respective halftone area and is coded with a "detail code". At least a remaining area of the halftone area is coded with an "unsharp code". The method offers the advantage of the possibility of an improved detail reproduction given simultaneous suppression of a moire and given a good data compression.

55 Claims, 3 Drawing Sheets

METHOD FOR CODING FACSIMILES

This is a continuation, of application Ser. No. 036,188, filed Apr. 9, 1987 now abandoned.

BACKGROUND OF THE INVENTION

The present invention relates to a method for coding facsimiles which are acquired when scanning originals which contain halftone areas. A problem to be solved is to provide an optimum transmission and/or storage of the corresponding informational data.

FIG. 1 shows a section enlarged about seven times from the facsimile of a bicolor halftone image that appeared in a daily newspaper. Visible therein is a rectangular pattern of black dots of different size and shape which is inclined by about 45° relative to the page edges. The black dots bleed into one another in dark regions and are in turn composed of an accumulation of quadratic solid areas which correspond to the facsimile scan spots. In the original, the center-to-center spacing of two halftone screening spots (a) amounts to 0.4 mm and the center-to-center spacing of two scan spots amounts to 0.075 mm.

Color halftone images can be printed in the same fashion when they are monochromatic, i.e. are composed of only a single color with locally variable saturation. In this case, the black dots would have to be replaced by dots of the respective color.

Chromatic halftone images (i.e. pictures containing a plurality of hues) as well as monochromatic halftone images whose color is not available as a printing ink are generally produced by superimposed printing of four patterns of different inclination and raster density in the colors yellow, magenta, cyan, and black. Upon transmission or storage and subsequent reproduction of facsimiles that contain halftone pictures, problems result, particularly a disruption due to moire and an unsatisfacotry data compression which are explained in greater detail in "Proc. of the 6th International Conference on Pattern Recognition, Munich 1982, pp. 489–491, Postl, W.: Halftone Recognition By An Experimental Text And Facsimile Workstation", incorporated herein by reference.

German Patent publications OS No. 2 516 322 and OS 3 024 322, both incorporated herein by reference, disclose methods by means of which areas in a facsimile covered by halftone images are searched by automatic methods and the areas which are found are coded with a so-called image code, whereas a so-called text code is employed for the other areas. The terms "image code" and "text code" mean codes that are particularly suitable for the respective structures.

Specifically disclosed in German OS No. 2 516 322 as an image code is a scanning procedure with reduced resolution—i.e., in other words a transformation of the samples which corresponds to an unsharp optical imaging—whose resolution or lack of sharpness is to be dimensioned such that the halftone raster is suppressed, followed by a coding of the transformed samples by delta pulse code modulation (DPCM) or some other code suitable for coding video signals.

Taken into consideration as a text code in the aforementioned publication are all codes suitable for coding bicolor patterns. Such codes have been specified for facsimile transmission in the publications "Standardization of Group 3 Facsimile Apparatus for Document Transmission T4, CCITT Yellow Book 1981, pages 232–236" and "Draft Recommendation T.b (2nd issue), CCITT Temporary Document No. 28, Geneva 1983", both incorporated herein by reference. They are suitable in identical fashion for coding the facsimiles of characters and of line graphics. They are less suited or altogether unsuited for the facsimile transmission of halftone images.

A favorable compression factor is achieved on the one hand and, on the other hand, moire is avoided (the latter not being expressly pointed out in this publication) with the coding method disclosed in German OS No. 2 516 322 which can be applied both to predefined halftone areas as well as halftone areas that have been automatically located. The method, however, has the disadvantage that details, the expanse of which lies on the order of magnitude of the spacing of the halftone raster spots or therebelow (for instance, thin lines, edges, or small characters printed in the picture), disappear or become unclear even though they were still clealy perceptible with the naked eye in the original facsimile.

SUMMARY OF THE INVENTION

An object of the present invention is to create a method of the type initially cited which, given optimum detail reproduction and maximum data compression, prevents or at least significantly restricts moire formation.

The object underlying the present invention is achieved by providing a coding of the halftone areas corresponding to an unsharp imaging in comparison to the original so that a so-called halftone raster is suppressed. A detail area $D_i$ is defined within a respective halftone area $H_i$, and it is coded with a detail code in a detailed coding step. At least a remaining area of the halftone area $H_i$ is coded with an unsharp code in an unsharp coding step.

The present invention proceeds from the same objective and the same basic method as the method disclosed in German OS No. 2 516 322, but avoids the disadvantages since a highly detailed sub-area (detail area) within the halftone area to be coded is either prescribed or automatically located and coded with a so-called unsharp code, preferably an unsharp transformation with following DPCM.

DESCRIPTION OF THE PREFERRED EMBODIMENTS

Figure 3:
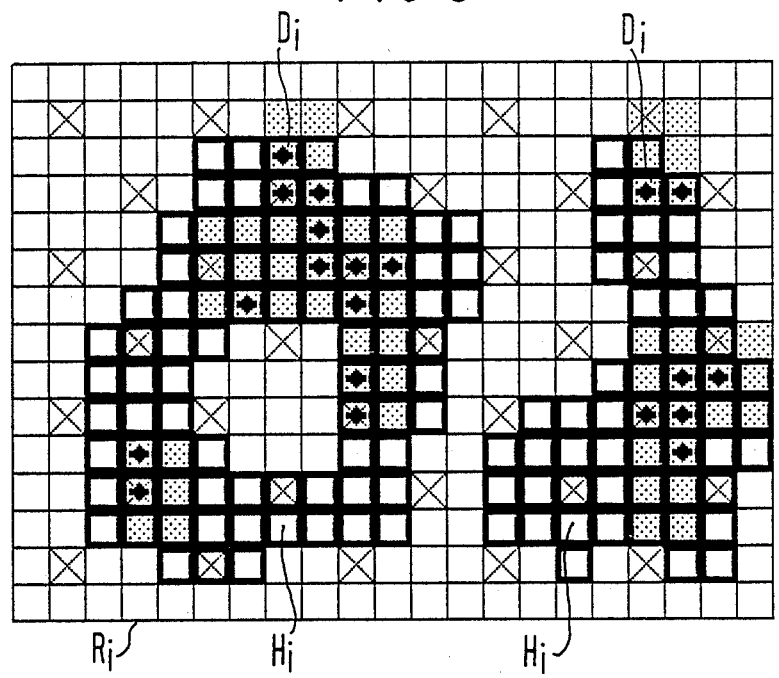
FIG. 3 shows a halftone area Hi within a rectangular area $R_i$ in magnified fashion.

An example for the coding of the halftone area shown in FIG. 3 is provided at the end of this specification under "Coding Example".

In the description provided below, the two aforementioned coding procedures are referred to as detail and unsharp coding.

Modifications of the invention shall be described below for coding both monochromatic as well as chromatic halftone areas in facsimiles. It is presumed that the position of these areas is given by the position of rectangular areas $R_i$ (i=0 ... n−1) in which the respective, usually non-continuous halftone areas $H_i$ (i=0 ... n−1) are contained.

Figure 2:
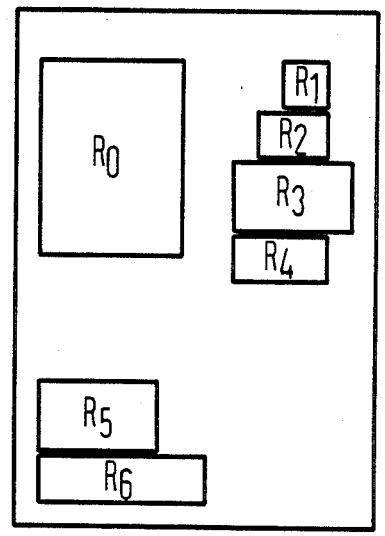
FIG. 2 schematically shows a facsimile with seven rectangular areas $R_0 \ldots R_6$.

FIG. 2, as already explained, schematically shows a facsimile with seven rectangular areas $R_0$ ... $R_6$. The coding of the position of $R_i$ can, for example, be performed by specifying the coordinates of the respective upper left and lower right corner of $R_i$ in a prescribed format, or in accordance with the rules defined in the publication "Draft Recommendation S.a, CCITT 1982". The coding of the contours of the halftone areas $H_i$—insofar as they are known and do not coincide with the boundaries of the demarcated rectangular areas—occurs by a so-called contour code. An example of such a code shall be specified below. When the boundaries of an $H_i$ are not indicated, then coincidence of $H_i$ and $R_i$ is assumed. It may also be meaningful under given conditions with known boundaries of $H_i$, to occupy the remaining area of $R_i$ with a uniform color, particularly white, and to undertake the further coding under the assumption that $H_i$ is identical to $R_i$.

The following description of various method features is limited to the coding of one of the halftone areas $H_i$.

Coding a Halftone Area $H_i$

Let the demarcated rectangular area $R_i$ contain SxZ solid area in Z lines and S columns which are represented by the same number of samples A(x,y) made available to the coding apparatus by a facsimile scanner or, under given conditions, by an apparatus which simulates such a scanner. The numbers x and y indicate the coordinates of the sample and are respectively numbered from 0 ... S−1 and from 0 ... Z−1.

As already explained, FIG. 3 shows a halftone area $H_i$ as well as the circumscribed rectangular area $R_i$ in a magnified presentation, whereby the column number S=21 and the line number Z=15 have been selected. One square of the grid marks one solid area. Elementary solid areas that belong to the (non-continuous) halftone area are shown with thicker edges. The detail area is identified by providing heavier dots in the center of the corresponding elementary or solid areas.

The horizontal spacing between neighboring elementary areas shall be referenced dx below and the vertical spacing shall be referenced dy. In FIG. 3, the two are identical. In case of a facsimile scanning in accordance with "Standardization of Group 3 Facsimile Apparatus for Document Transmission T4, CCITT Yellow Book 1981, pages 232–236", incorporated herein by reference, for example dx=⅛ mm and dy=1/7.7 mm.

The following description is based on the assumption that every sample A(x,y) is available in pre-coded form in a data store, for example in the form of a code word that is 8 bits long which specifies the address in a lookup table which contains the additive color components R(x,y), B(X,y) and G(x,y) or the color parameters Y(x,y), U(x,y) and V(x,y), standard in television technology—of which Y(x,y) represents the luminance—at the addressed location in a 24-bit code word respectively coded with 8 bits. Modifications of the coding of color information can be derived from the technical literature, for example "Proc. of the 1984 Internatl. Zurich Seminar on Digital Communication, IEEE Catalog No. 84CH1998-4, pages 33–38", incorporated herein by reference. The employment of so-called lookup tables is standard in image processing technology.

In the simplest case, A(x,y) is coded with one bit and represents the luminance of a bicolor pattern. In case these samples are stored in a compression code, for example, in accordance with "Standardization of Group 3 Facsimile Apparatus for Document Transmission T4, CCITT Yellow Book 1981, pages 232–236", they can be converted by decoding into any required form for processing.

What is meant by color coding below is that a color information coded in or derivable from the samples A(x,y) is utilized for the detail and/or unsharp coding.

Method for Unsharp Coding

At selected locations of the rectangular area $R_i$—these are referred to below as "center points"—so-called mean scan values AM(x,y) are generated and subsequently coded by forming a weighted mean value or by another so-called "unsharp transformation" which is dimensioned such that the halftone raster is suppressed. The totality of code data thus generated is referred to as "unsharp code sequence" US.

In case of a color coding, a mean scan value AM(x,y) is generally formed of a number of parameters, for example three mean color values RM(x,y), GM(x,y) and BM(x,y) or three values YM(x,y), UM(x,y) and VM(x,y) that represent the mean values of the respective color constituents or color components. Accordingly, it is advantageous under given conditions to realize different degrees of unsharpness for different color parameters.

Codes for coding the mean scan values are not being specified herein. The codes known from television technology can be employed, particularly delta pulse code modulatio (DPCM). The following alternatives are especially considered in case of a chromatic facsimile:

(a) Only the luminance or YM(x,y) is coded by means of DPCM;

(b) RM(x,y), BM(x,y) and GM(x,y) are respectively coded by means of DPCM;

(c) Subtractive fundamental color mean values JM(x,y), MM(x,y), CM(x,y) and SM(x,y)—which correspond to the colors yellow, magenta, cyan, and black—are generated from the mean scan values AM(x,y)—by way of the additive mean fundamental color values RM(x,y), BM(x,y) and GM(x,y)—and are respectively coded with DCPM or some other code.

Methods for generating the subtactive fundamental colors from the additive fundamental colors are known from printing technology—see "Bruckmann's Handbuch der Drucktechnik, Bruckmann Munich 1981" which provides an overview and is incorporated herein by reference.

Method For The Selection Of The Center Points For The Unsharp Coding

Every $h^{th}$ elementary area of every $v^{th}$ line which is at least contained in the halftone area $H_i$ is selected as a center point. The parameters h and v (both $\geq$ 1) are to be selected dependent on the type of unsharp transformation applied so that a satisfactory reconstruction of the halftone image from the coded data is possible.

This rule states nothing about the mutual shift of successive center point sequences or about the position of the uppermost center point row. Two alternatives preferably come into consideration for the mutual shift:

90° Center Point Grid: Successive center point rows lie above one another. This alternative has the advantage that coding procedures which presume such a grid can be incorporated without significant modification.

45° Center Point Grid: Successive center point rows are offset by h/2 relative to one another. This alternative has the advantage of a better approximation of the image content by the unsharp code given the same number of center points.

Given an at least approximately identical scan resolution in the horizontal and vertical directions (dx dy), it is recommendable to select v=h in the first case and v=h/2 in the second case. A selection of center points in accordance therewith is marked in FIG. 3 (with h=4) by crosses.

Figure 4:
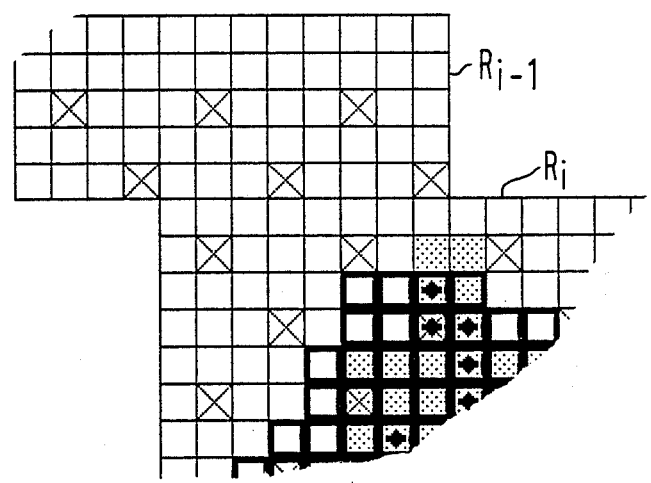
FIG. 4 shows an excerpt (the area of the upper left-hand corner) of the rectangular area $R_i$ shown in FIG. 3 with an excerpt from an adjacent rectangular area $R_{i-1}$.

The position of the uppermost center point row is advantageously selected such that this row fits into the center point grid of previously or simultaneously processed rectangular areas $R_j$ (j=i) adjacent to $R_i$, as indicated in FIG. 4, which indicates a section of the area $R_i$ with a neighboring section of the area $R_{i-1}$ including entered center points.

This method thus facilitates a hitless interpolation in a later reconstruction of the facsimile from the coded data. It is most simply accomplished in that a uniform center point grid is defined for the whole facsimile for every unsharp coding with parameters that are otherwise the same.

Method for Unsharp Transformation

The generation of the mean scan values AM(x,y)—or of corresponding color values—occurs by means of a weighted averaging according to the following equation:

$$AM(x,y)=4 \times A(x,y)+2 \times ((A(x-c,y-c)+A(x-c,y+c)+A(x+c,y-c)+A(x+c,y+c))+A(x-d,y)+A(x,y-d)+A(x+d,y)+A(x,y+d)$$

Figure 1:
FIG. 1, as already explained, shows an excerpt magnified about seven times from the facsimile of a bicolor (black/white) halftone picture that appeared in a daily newspaper.

As needed, this value can be multiplied by a factor that is independent of x and y. Like h and v, the distances c and d can be empirically identified. Valid for a monochromatic quadratic halftone raster (as shown in FIG. 1) having the point spacing a and given a scan spot spacing identical or nearly identical in horizontal and vertical directions (dx≃dy) are the guiding figures $$c=h/4, \ d=h/2, \ h=a/dx.$$

The same guiding figures are valid when the spacing of the centers of two neighboring halftone raster spots is inserted for "a" by approximation for a hexagonal halftone raster as well. They are also valid for the individual color rasters in the case of a color coding, whereby identical values of h, c, and d need not necessarily be employed for different color rasters.

For the coding of a so-called Group 3 facsimile of a halftone picture printed in a daily newspaper with the halftone raster point spacing a=0.4 mm and the scan spot spacing dx=0.125 mm and dy=0.130 mm, the above-specified approximation or estimate produces guiding figures that are not whole numbers. Rounding these guiding figures to h=4, c=1, d=2 has proven favorable. The above-specified formula for AM(x,y), however, is also meaningful for non-whole-number coordinates of a sample, even though neither an elemental area nor a sample actually exists for a point having such coordinates. In such a case, an imaginary sample A(x',y')-wherein x' and y' are the coordinates of the sample—is to be generated by means of interpolation, for example according to the following formula:

$$A(x',y')=(Y+1=y') \times ((X+1-x') \times A(X,Y)+(x'-X) \times A(X+1,y))+(y'-Y) \times ((X+1-x') \times A(X,Y+1)+(x'-X) \times A(X+1,Y+1))$$

whereby the largest whole numbers that are $\leq x'$ or respectively $\leq y'$ are to be inserted for X and Y.

Under given conditions—particularly when the identified value of h is greater than 4—it can prove advantageous under predicate expressions experimentally verifiable for specific halftone raster densities, to employ a limited unsharp transformation A'(x',y') of the samples in the environment of the point (x',y') in the execution of the aboveindicated formula for AM(x,y) instead of the samples A(x',y'). Here, x' and y' denote the respective coordinates. This is equivalent to a reduction of the scan resolution by about the factor h/4 in the horizontal and vertical direction. When, for example, a halftone area having the halftone raster spacing 0.4 mm has been scanned with a scan spot spacing of 0.0625 mm, then the substitution of the samples A(x',y') by values A'(x',y') with a limited unsharp transformation is recommended according to the formula:

$$A'(x',y')=4 \times A(x',y')+2 \times ((A(x'-1,y')+A(x',y'-1)+A(x'+1,y')+A(x',y'+1))+A(x'-1,y'-1)+A(x'-1,y'+1)+A(x'+1,y'-1)+A(x'+1,y'+1)$$

When the halftone raster density is unknown, then the coding can occur with subject-dependent estimate values. For illustrated periodicals for example, a raster point spacing of 0.15 to 0.2 mm is typical. Another possibility is an automatic identification of the raster point spacing, for example by a Fourier analysis, which can be connected with a method for automatically locating halftone areas based on the interpretation of the Fourier spectrum—as disclosed in German OS No. 3 024 322, incorporated herein by reference.

The above-described transformation method, like any transformation of digitally stored data, can be realized by means of a computer program. In order to speed up the method, however, realization by means of special, preferably integrated circuits is recommended.

Method For Detail Coding

The following description with reference to FIG. 3 is based on the assumption that a detail area (as marked by dots in FIG. 3) has either been already automatically found or has been input into the coder as preliminary information. In the following, the elementary elements contained in the detail area shall be referred to as detail elements, and the remaining elementary elements contained in the halftone area $H_i$ shall be referred to as coarse elements. The remaining elementary elements contained in $R_i$ are referred to as residual elements.

The coding occurs by generating a detail code sequence DS composed of a position code sequence PS which specifies the position of the detail elements in the rectangular area $R_i$, and of a value code sequence WS which specifies the values of the detail elements in $R_i$, interlaced under given conditions with PS and/or with the unsharp code sequence US.

A method is provided for generating the position code sequence PS. A bicolor image of the rectangular area $R_i$—reduced under given conditions by whole-number factors u and w in horizontal or vertical directions—and in which the detail elements are replaced by black and the coarse elements as well as the residual elements are replaced by white picture elements, is coded with a bicolor code. For example one of the codes is described in "Draft Recommendation T.b (2nd Issue), CCITT Temporary Document No. 28, Geneva 1983", incorporated herein by reference, may be employed. In the case of a reduction, it is first necessary that, in $R_i$, the vertical boundaries of the detail area in w successive lines and the horizontal boundaries in u successive columns coincide.

Rounding

Such a demarcated detail area can be derived by rounding from another (primary) detail area. A field of, for example u x w elementary elements is then allocated to the rounded detail area when a minimum number k ($\geq 1$) of the elementary elements contained in this field belong to the primary detail region.

FIG. 3 shows an example for this with k=1, namely the elementary elements of a detail area produced by rounding (with u=2 and w=3) from the detail area marked with dots is identified by a dot pattern.

Analogously applying for the positioning of the raster of the u x w fields (rounding fields) is the same thing that applies for the center point grid, i.e. a hitless continuation in neighboring rectangular or halftone areas is to be preferred, as indicated in FIG. 4.

In a method for generating the word code sequence WS, a bicolor image of the rectangular area $R_i$ has the detail elements, dependent on their luminance value, replaced by black or white, and the coarse elements as well as the residual elements replaced by white picture elements. It is coded with a bicolor code, for example with one of the codes described in "Draft Recommendation T.b (2nd Issue), CCITT Temporary Document No. 28, Geneva 1983", incorporated herein by reference. WS can be generated in a particularly simple fashion by connecting the code words which were employed for the pre-coding of the sample A(x,y) coinciding with detail elements.

A simplified form of color coding is that only the luminance of the sample is coded in WS and the chrominance of these picture elements is taken from the unsharp code sequence US in a following reconstruction of the facsimile from the coded data.

In a method of interlacing the sequences US, PS, and WS which saves memory space, m lines of US, n lines of PS, and n x w lines of WS follow one another (in, moreover, an arbitrary sequence). By "line" is meant that part of the respective code sequence allocated to a line of picture elements in $R_i$. Also, w ($\geq 1$) is the aforementioned reduction factor, and n is an arbitrary number $\geq 1$.

In case the previously described method is applied for the unsharp coding, it is advantageous in view of low memory requirements to select a ratio m:(n x w) =1:v, where v is defined in accordance with this description.

Method for Automatically Finding a Detail Area

Respectively generated for selected elementary elements (so-called test points)—which are preferably arranged in a quadratic grid—is a detail criterion whose value indicates whether the corresponding test point is contained in the detail area or not.

Elementary elements that are not test points have their final detail criterion generated by interpolation from the detail criteria of the surrounding test points.

A particularly simple interpolation method is that the corresponding elementary elements have the detail criterion of the closest or, in case this indication is not unequivocal, of one of the closest test points allocated to it.

In addition to this first detail criterion, further or additional detail criteria can be generated in the same fashion as the first detail criterion for test points selected according to different points of view under given conditions. Additional detail criteria can be assigned to non-test points according to the same pattern. The final detail criterion is then formed by combination of the individual criteria (of the first detail criterion and of the additional detail criteria).

A simple combination method is that the individual criteria are interpreted as truth values and the final detail criterion is generated by means of logical OR-ing of the individual criteria.

In the following, two alternatives for generating a detail criterion in the form of a truth value shall be described. They are referred to as coarse or fine structure criterion and have either the value "true" or the value "false", and can thus be respectively coded by means of a 1 bit. For example, the first can be used as primary and the second as auxiliary detail criterion.

Coarse Structure Criterion

The slope of the mean luminance value YM(x,y)—which may be identical to a linear function of the mean scan value AM(x,y) under given conditions—is compared to an empirically determined threshold SW. The detail criterion has the value "true" when a monotonously rising function of the slope, for example the slope itself or its square, is greater than the same function of the threshold.

By "slope" is meant an approximation of the amount of the gradient of YM(x,y). For example, given the preconditions established in the description of the method for unsharp transformation, a suitable approximation is defined by the following equation which indicates the square q(x,y) of the slope at the point (x,y):

$$q(x,y)=2x(A(x-c,y-c)-A(x+c,y+c))^2+2x(A(x-c,y-c)-A(x+c,y-c))^2+-(A(x-d,y)-A(x+d,y))^2+(A(x,y-d)-A(x,y+d))^2$$

The parameters c and d have the same meaning here as in the description of the method for unsharp transformation. A time-saving realization of this function is possible with integrated modules or special signal processors.

Under the same pre-conditions as in generating the mean scan values AM(x,y) in accordance with the previously specified equation, it is recommended to employ a limited unsharp transformation of the samples instead of the samples A(x',y') for generating the values q(x,y).

The grid of the test points that are employed for generating the coarse structure criterion is advantageously selected identical to the grid of the center points, augmented under given conditions by a respectively additional point between two horizontally neighboring center points.

Fine Structure Criterion

An address forming unit generates an address from a selection of samples from the environment of the test point and forwards this to a data store which contains the detail criterion coded with a 1 bit at the addressed memory location which is valid for the respective combination of samples.

The filling of the data store can occur experimentally—by subjective evaluation of simulated patterns—or with the assistance of a programmable function of the participating samples in a one-time time expenditure. Complicated interrelationships can thus also be realized.

It may be sufficient under given conditios to form the address from the luminance values (quantized to 1 bit) of the elementary elements situated in an area which has at most twice the area of a two-dimensional halftone raster period, i.e. the area $2 \times a^2$ when a is the raster spot spacing. At least given black/white halftone rasters, it is sufficient, for example, to identify the truth value of at least one of the two following conditions:

(I) The mean luminance of this area deviates both from "white" as well as from "black" by less than an empirically identifiable value d; and (II) Halftone raster spots which are interconnected to neighboring halftone raster spots of the same color are situated in this area or at the edge thereof.

When both conditions (I) and (II) are true, then the value of the detail criterion is "true".

The memory expense for this simple fine structure detector is insignificant; a halftone picture printed in a typical daily newspaper contains only $(0.4/0.125)^2 = 10$ group 3 samples in the area of a halftone raster period, ds.0.4x0.4 mm².

The grid of the test points that are employed for generating the fine structure criterion should be at least as dense as the grid of the test points for the coarse structure criterion and, advantageously, should be selected identical to the latter.

Method for Contour Coding

The boundaries of the halftone area $H_i$ are coded in the same way as the boundaries of the detail area, with rounding field dimensions u' and 2' instead of u and w under given conditions. The generated code sequence is interlaced with the other code sequences under given conditions, preferably such that n×w/w' lines of the code sequence KS generated by the contour coding are inserted before or after n x w lines of WS. n is then to be selected such that this is a whole number.

Synchronization of the Sub-Codes

All code parameters that are not implicitly defined (such as, for instance, the code table employed in a code according to "Draft Recommendation T.b (2nd Issue), CCITT Temporary Document No. 28, Geneva 1983") or summarily for the overall facsimile such as, for instance, a center point or rounding grid, are to be transmitted at a declared location in a declared code. Included therein are, for example, the parameters h and v mentioned in the previously described method for the selection of the center points for the unsharp coding, the raster orientation (45° or 90°), as well as the raster position established, for example, by the position of the first center point of the uppermost row of center points (1,1 in FIG. 3) with reference to the rectangular area $H_i$. Due to the slight informational content of these parameters, both position as well as coding are largely insignificant for the attainable data compression.

It is recommended, however, to transmit these parameters interlaced with the remaining code sequences of the respective halftone area, and preferably in the form of the parameter code sequence <id> <param>.

Here, <id> is a declared code word which identifies the significance and number of the following parameters (for example, "two coordinates of the first center point") (and which corresponds to the operator in computer instructions). The symbol <param> denotes the sequence of these parameters, for instance the two numbers "1" and "1", respectively coded with 16 bits. This method has the advantage that the respective parameter code sequence can be omitted. In this case, the decoder inserts a predefined or the most recently defined value for the corresponding parameter dependent on the declaration.

In such a parameter format of this type, a determination can also be made whether center points which, although situated in the rectangular area $R_i$, are not situated in the halftone area $H_i$ should be represented in the unsharp code sequence US or not. In the former instance, the uppermost row of center points and the first center point of the following row of the pattern shown in FIG. 3 would be transmitted, but would not be transmitted in the latter instance.

For simplification reasons and in view of the fact that the rectangular areas may, as a whole, be entirely or nearly entirely filled by the enclosed halftone area, it is recommended to involve all center points contained in $R_i$ in the coding in US, augmented by auxiliary information under given conditions (for example, given DPCM). A compromise solution is comprised therein of transmitting center points which are situated outside of $H_i$ and are required for the interpolation in the reconstruction, for example every center point which is at a distance of less than h elementary elements from $H_i$—in a vertical or horizontal direction.

Corresponding considerations apply for the detail coding, particularly in the case of a rounding, for which a method was previously described in case the boundaries of the rounding fields do not coincide with the boundaries of $R_i$, as in FIG. 3. The two following alternatives (I) and (II) are preferably taken into consideration:

(I) The boundaries of $R_i$ are rounded to rounding field boundaries, i.e. are approximated thereto; and (II) Rounding fields not entirely contained in $R_i$, or the detail elements contained in such rounding fields, are not taken into consideration.

Figure 5:
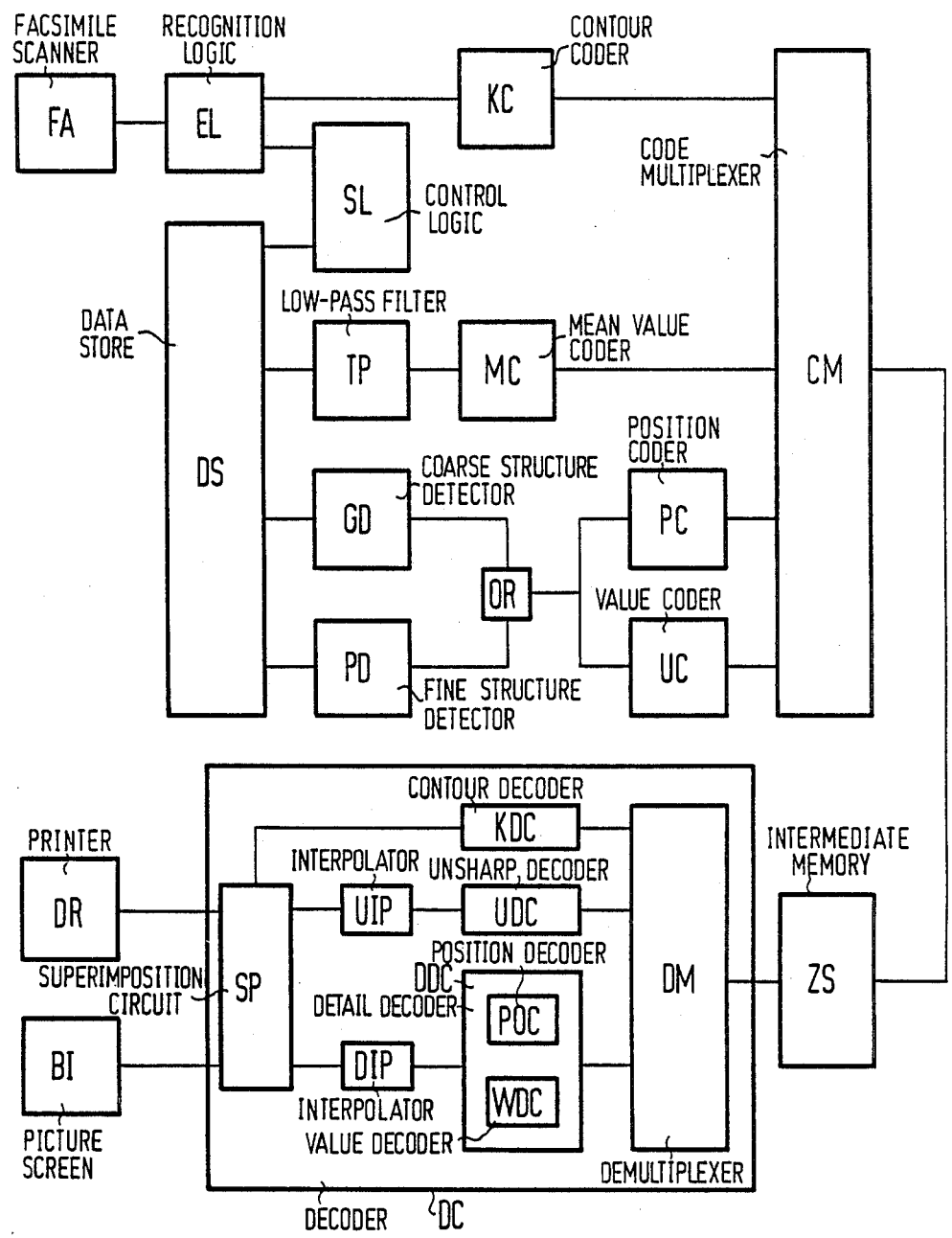
FIG. 5 shows a schematic block diagram of a preferred exemplary embodiment of an apparatus for the implementation of the method of the invention.

In the following, a preferred exemplary embodiment for the implementation of the method of the invention shall be described with reference to FIG. 5.

A recognition logic EL investigates the sample output by a facsimile scanner FA as to the presence of rectangular areas with halftone content. When such an area $R_i$ has been found, then a control logic SL stores its position, its content and, under given conditions, the contour of the halftone area contained therein in a data store DS which can be a part of a multi-purpose memory—for example, the main memory of a processor—and initiates the coding of the area, including the supply of the required clock information.

A three-dimensional low-pass filter TP takes precoded samples from the data store DS, subjects them to an unsharp transformation, and forwards the result to a mean value coder MC whose output is connected to a code multiplexer CM.

Simultaneously or chronologically interlaced with the unsharp transformation—depending on the prescription of the control logic employed—, a coarse structure detector GD and a fine structure detector PD take samples from the data store DS and forward a respective detail criterion (namely a coarse or fine structure criterion as previously described) via an OR gate OR to a position coder PC and to a value coder UC whose second input is likewise connected to the data store DS. The outputs of both coders are connected to the code multiplexer CM. A further input of the code multiplexer CM receives the coded curve of the boundaries of $H_i$ via a contour coder KC whose input is either connected to the data store DS or (as shown) directly to the recognition logic EL. The code multiplexer executes the interlacing of the code sequences forwarded to its inputs.

The coded data proceed via an intermediate memory ZS, a demultiplexer DM, and a decoder DC to two reproduction units, namely a printer DR and a picture screen BI.

The decoder DC contains a separate function unit for every received subcode, i.e. a contour decoder KDC, an unsharp decoder UDC, and a detail decoder DDC which is in turn composed of a position decoder PDC and a value decoder WDC. The decoder DC also contains interpolators UIP and DIP which interpolate the mean scan values output by the unsharp decoder UDC or the detail elements output by the detail decoder DDC over the grid required by the reproduction unit (and this, generally, is not identical with the scan raster), and a superposition circuit SP which superimposes the output signals of the interpolators UIP and DIP. The type of superposition is generally exclusive, i.e. the output value of one of the interpolators UIP and DIP appears at the output of the superposition circuit SP, but can also be differently defined by the type of coding, for example, to such effect that luminance and chrominance values of the detail area are taken from different interpolators, namely DIP and UIP.

Coding Example

The following example shows the coding of the halftone area shown in FIG. 3 wherein contour, unsharp, position, and value code sequences are interlaced for one interlacing period. The following parameter values are thereby assumed:

h=4, v=2, m=3, n=2, w=3.

The interlacing period this ecompasses 6 facsimile lines. With respect to the meaning of the parameter designations h, v, etc., as well as of other designations not explained here, please see the specification.

A contour code according to the pattern of the position code is employed, with the rounding field u' x w' instead of u x w. Here it is assumed that u'=w'=1.

| | | | | | |
|---|---|---|---|---|---|
| <R> | 21 | 15 | 800 | 1630 | |
| <H> | <h> | | | | |
| <K> | 1 | 1 | 0 | 0 | 6 |
| | 21W | | | | |
| | 21W | | | | |
| | 5W | 4S | 7W | 2S | 3W |

-continued

| | | | | | |
|---|---|---|---|---|---|
| | 5W | 6S | 5W | 3S | 2W |
| | 4W | 9S | 3W | 3S | 2W |
| | 4W | 9S | 3W | 3S | 2W |
| <U> | 4 | 2 | 1 | 1 | 3 |
| | 3d | 7d | 11d | 15d | 19d |
| | 9d | 13d | 17d | 21d | 25d |
| | 11d | 15d | 19d | 23d | 27d |
| <P> | 2 | 3 | 1 | 1 | 2 |
| | 3W | 1S | 4W | 1S | |
| | 2W | 3S | 5W | | |
| <W> | 6 | | | | |
| | 4W | | | | |
| | 0W | 1S | 3W | | |
| | 0W | 4S | | | |
| | 3W | 1S | 2W | | |
| | 2W | 3S | | | |
| | 1W | 1S | 2W | 1S | 1W |
| <K> | 1 | 1 | 0 | 0 | 6 |
| | 3W | 20S | 4W | 3S | 1W | etc.

Explanations to the Coding Example

<..> denotes a subcode switch, i.e. a standard code word that identifies a specific subcode (for example, unsharp code, position code, etc.).

A number without following letter denotes a number in a standard format, for example a 16-bit data word.

The spaces and the arrangement in lines serve only for optical presentation; they have no further significance.

<R> denotes "Code for Rectangular Area", for example "0000001110". After this code word, the decoder expects four numbers (21, 15, 800, 1630) which specify the width and the height of the area and the position of the rectangular area in the facsimile (by the coordinates of the upper left corner) in elementary elements.

<H> denotes "Code for Halftone Area". The 10-bit code word "0000001001" reserved in "Draft Recommendation T.b (2nd Issue), CCITT Temporary Document No. 28, Geneva 1983", incorporated herein by reference can, for example, be used. Under given conditions, a sequence of auxiliary parameters (indicated by <h>) can be subsequently indicated, for example the following subcode switches and their parameters, which then need not be repeated in every code sequence period.

Code words that can appear in a different significance before <H> can definitely be reemployed for the subcode switches <K>, <U>, <P>, <W>, for example all combinations of "0000001xxx" (x=arbitrary binary number) not required elsewhere (for example, for switching into the "non-compressed mode" after <W> described below). The same applies to code switches which occur after the subcode switches under given conditions and represent variations of the respective subcode.

<K> denotes "Code for Contour Area". After this code word, the decoder expects the parameters:
(1,1) Width and height of the rounding field;
(0,0) Coordinates of the upper left corner of the first rounding field (1-,-1) would denote "accept global coordinates"
(6) Number of following code lines.

<U> denotes "Code for Unsharp Coding". After this code word, the decoder expects the parameters:
(4,2) h and v
(1,1) Coordinates of the first center point
(3) Number of following code lines. .

<P> denotes "Code for Position Coding". After this code word, the decoder expects the parameters:
(2,3) Width and height of the rounding field;
(1,1) Coordinates of the upper left corner of the first rounding field;
(2) Number of following code line.

<W> denotes "Code for Word Coding". After this code word, the decoder expects the number (6) of following code lines as a parameter.

The code lines themselves follow subsequent to the respective parameters. In the example, iw denotes the code word for i white elementary elements and 'is' denotes the code word for i black elementary elements according to a code provided for the respective coding.

When this code, for example, is the code according to "Standardiation of Group 3 Facsimile Apparatus for Document Transmission T4, CCITT Yellow Book 1981, pages 232–236", incorporated herein by reference, with k=1, then 5W="1100" and 4s="011".

The code according to "Draft Recommendation T.b (2nd Issue), CCITT Temporary Document No. 28, Geneva 1983," incorporated herein by reference, is particularly suitable. This code includes the possibility of engaging the so-called "noncompressed mode" by inserting the code word "0000001111". This possibility is preferably taken into consideration for the value coding (according to W).

In the sequence "3d 7d ...", id denotes the coding of the mean scan value i with a suitable unsharp code, preferably by means of DPCM, for example by 4-bit words which indicate the difference from the preceding decoded value restricted to the area $(-1 \ldots +7)$, i.e.

3d 7d 11d 15d 19d = "0011 0100 0100 0100 0100".

The sequence of these mean scan values was selected in accordance with the arbitrary equation $$AM(x,y) = x + 2y$$

The fact that mean scan values outside of the halftone area also do not have a uniform value (which would correspond to a specific ambient color, for instance white) is, however, intentional. Due to the spreading effect of the unsharp transformation, at least in the proximity of the contour of the halftone area, this generally also applies to patterns which are not simulated (like that shown in FIG. 3). These mean scan values are also required after the decoding for an exact interpolation of the samples in the halftone area close to the contour. When such an exact interpolation is not provided, then the coding of these values can be omitted. For the unsharp code sequence indicated in the example, this would mean substitution by the sequence

| | | | |
|---|---|---|---|
| 13d | | | |
| 15d | 19d | | 27d | which would result in considerable interpolation errors. This error would be less serious in less imaginary examples.

A usable interpolation is possible by means of a compromise. For example, mean scan values are only transmitted when the respective center points are at a distance of at least h elementary elements in a horizontal direction and at least v elementary elements in a vertical direction from the nearest elementary element situated in the halftone area. The code sequence specified in the example would then be shortened to the code sequence

| | | | | |
|---|---|---|---|---|
| | 7d | 11d | | 19d |
| 9d | 13d | 17d | 21d | 25d |
| 11d | 15d | 19d | 23d | 27d |

Only 13 mean scan values would then have to be coded instead of 15. Such a saving is insignificant and is not worth the expense for the complication of the code connected therewith even when, under given conditions, coding of mean scan values is only eliminated in case the respective center points are situated in the edge region. The first code line would then be 7d 11d 15d 19d.

This coding alternative would yield a significant saving of code bits only for those facsimile types wherein the areas of the halftone areas are on the average considerably smaller than the areas of the circumscribed rectangular areas.

Regardless of the advantages or disadvantages of any code alternatives, such alternatives can be indicated before or within the code sequence by special code switches indicated either globally (for the entire facsimile) or subsequent to the standard parameter according to <U>.

Although various minor changes and modifications might be proposed by those skilled in the art, it will be understood that I wish to include within the claims of the patent warranted hereon all such changes and modifications as reasonably come within my contribution to the art.

I claim as my invention:

1. A method for coding a facsimile acquired when scanning an original and which contains halftone areas $H_i$ where i is a running number of a respective halftone area within the facsimile to be coded, comprising the steps of:
   in order to substantially reduce moire and to achieve data compression, executing a coding of the halftone areas corresponding to an unsharp imaging in comparison to the original such that a so-called halftone raster is suppressed;
   defining a detail area $D_i$ within a respective halftone area $H_i$ and coding it with a detail code in a detail coding step; and
   at least a remaining area of the halftone area $H_i$ being coded with an unsharp code in an unsharp coding step.

2. A method according to claim 1 including the step of scanning such that a sample is respectively allocated to one elementary element of the original.

3. A method according to claim 1 including the steps of:
   converting the data generated by coding the detail area $D_i$ into a detail code sequence DS and converting the data generated by the coding of the remaining area into an unsharp code sequence US;
   providing a contour code sequence KS which describes a path of the contour of the halftone area $H_i$ within a rectangular area $R_i$ in which the halftone area $H_i$ is contained; and
   transmitting the sequence DS, the sequence US, and the sequence KS to a processing apparatus.

4. A method according to claim 1 including the step of defining a detail area by prescription.

5. A method according to claim 1 including the step of automatically finding and defining a detail area.

6. A method according to claim 1 wherein for a selected grid of test points, generating a respective first detail criteria in the form of a truth value, the truth value indicating whether or not the corresponding test point is contained in a detail area.

7. A method according to claim 6 including the step of generating additional detail criteria for at least one additional grid of test points.

8. A method according to claim 6 including the step of allocating the detail criterion to elementary elements that are not test points by interpolation from detail criteria of neighboring test points.

9. A method according to claim 8 including the step of executing the interpolation such that the detail criterion of a nearest test point, or if the indication is not unequivocal, of one of the nearest test points, is allocated to the corresponding elementary element according to a fixed selection principle.

10. A method according to claim 6 including the step of forming for a respective elementary element a combined detail criterion by combination of all detail criteria allocated to this elementary element.

11. A method according to claim 10 including the step of undertaking the combination such that the combined detail criterion is generated by logical OR-ing of the first and of every additional detail criterion.

12. A method according to claim 1 including the step of generating mean scan values and subsequently coding them for selected location center points of a rectangular area $R_i$ which contains a halftone area $H_i$ to be coded; and generating the mean scan values upon at least partial exclusion of the detail area by an unsharp transformation of the samples by formation of a weighted mean value dimensioned such that the halftone raster is suppressed.

13. A method according to claim 12 including the step of providing the coding by means of delta pulse code modulation DPCM.

14. A method according to claim 12 including the steps of selecting every $h^{th}$ elementary element of every $v^{th}$ line which is at least contained in the halftone area $H_i$ as a center point; and selecting parameters h and $v \geq 1$ and such that they are dependent on a type of unsharp transformation applied so as to enable an unsharp reconstruction of the corresponding halftone picture from the coded data.

15. A method according to claim 14 including the step of arranging the center points in a quadratic grid oriented in one of the alignments parallel or perpendicular relative to edges of the original.

16. A method according to claim 14 including the step of arranging the center points in a quadratic grid oriented at an angle of 45° relative to edges of the original.

17. A method according to claim 14 including the step of providing the unsharp coding for a plurality of the halftone areas contained in the facsimile with the same parameters, and employing a shared center point grid for these halftone areas.

18. A method according to claim 12 including the step of generating the mean scan values by a weighted averaging in accordance with the equation $$AM(x,y) = 4xA(x,y) + 2x((A(x-c,y-c) + A(x-c,y+c) + A(x+c,y-c) + A(x+c,y+c)) + A(x-d,y) + A(x,y-d) + A(x+d,y) + A(x,y+d)$$

wherein x and y are coordinates of the respective center point, AM(x,y) is the mean scan value and A(x',y') is a sample allocated to the elementary element having coordinates (x',y'), and c and d are empirically determined parameters.

19. A method according to claim 18 wherein for a monochromatic quadratic halftone raster having a raster spot spacing 'a', defining guiding figures of the parameters c and d by equations $$c = h/4, \ d = h/2, \ h = a/dx$$

where dx is a spacing of the scan spot.

20. A method according to claim 18 wherein for a monochromatic hexagonal halftone raster having a raster spot spacing 'a', defining guiding figures of the parameters c and d by equations $$c = h/4, \ d = h/2, \ h = a/dx$$

where dx is a spacing of the raster spot.

21. A method according to claim 18 wherein given presence of non-whole-number values of coordinates of a sample, generating an imaginary sample by interpolation.

22. A method according to claim 12 including the steps of acquiring samples in the form of a plurality of color parameters Y(x,y), U(x,y) and V(x,y) wherein Y(x,y) is luminance, and U(x,y) and V(x,y) are first and second chrominance parameters; and forming mean color values by unsharp transformation for each respective color parameter.

23. A method according to claim 12 including the steps of acquiring samples in the form of a plurality of additive elementary color values R(x,y), B(x,y), and G(x,y) which correspond to the colors red, blue, and green; and forming mean color values by unsharp transformation for each color component.

24. A method according to claim 22 including the step of providing the unsharp transformation for different color parameters with different unsharpness degrees.

25. A method according to claim 23 including the step of providing the unsharp transformation for different color components with different unsharpness degrees.

26. A method according to claim 22 including the step of coding only a mean luminance color value YM(x,y) formed for the luminance.

27. A method according to claim 12 including the step of generating subtractive elementary color mean values JM(x,y), MM(x,y), CM(x,y) and SM(x,y) which correspond to colors yellow, magenta, cyan and black employed in printing technology and coding them with DPCM, the subtractive elementary color mean values being generated from mean scan values AM(x,y) via mean color values RM(x,y), BM(x,y) and GM(x,y) formed from additive elementary color values.

28. A method according to claim 1 including the steps of converting the data generated by coding of the detail area $D_i$ into a detail code sequence DS by generating a position code sequence PS which specifies one of the parameters contours of the detail area $D_i$ or position of the elementary detail elements contained in the detail area $D_i$, a value code sequence WS also being generated with specified values of detail elements.

29. A method according to claim 28 including the steps of providing a rectangular area $R_i$ in which the half tone areas $H_i$ are contained, and generating the position code sequence PS such that a bicolor image of the rectangular area $R_i$ is coded with a bicolor code, detail elements in the rectangular area $R_i$ being replaced by black picture elements and remaining elementary elements of the rectangular $R_i$ being replaced by white picture elements.

30. A method according to claim 29 including the steps of generating the position code sequence PS such that a bicolor image of the rectangular area $R_i$ is coded with a bicolor code, the rectangular area $R_i$ being reduced by whole number factors u and w in horizontal and vertical directions, the detail elements being replaced by black elementary elements and the remaining elementary elements of the rectangular area $R_i$ being replaced by white elementary elements, and a detail area extending in a vertical direction over multiples of w successive lines and in the horizontal direction over multiples of u successive columns, wherein u and w are whole numbers.

31. A method according to claim 30 including the step of deriving a detail area that extends in a vertical direction over multiples of w successive lines and extends in a horizontal direction over multiples of u successive columns by rounding from another primary detail area, a respective field of u.w elementary elements being allocated to the detail area when a predetermined minimum number K (1) of the elementary elements contained in this field belongs to the primary detail area.

32. A method according to claim 31 including the steps of rounding several detail areas contained in the facsimile with same dimensions of the rounding field u and w, and employing a common rounding field grid.

33. A method according to claim 28 wherein a rectangular area $R_i$ contains the halftone areas $H_i$, and including the steps of generating the value code sequence WS such that a bicolor image of the rectangular $R_i$ is coded with a bicolor code, the rectangular area $R_i$ having detail elements which, dependent on their luminance value, are replaced by black or white elementary elements and remaining elementary elements of the rectangular area $R_i$ are replaced by white elementary elements.

34. A method according to claim 28 including the steps of forming the value code sequence WS from samples which coincide with the detail elements.

35. A method according to claim 28 including the steps of coding only a luminance of the samples in the value code sequence WS, and in a following reconstruction of the facsimile, acquiring chrominance values of these elementary elements from an unsharp code sequence US by interpolation.

36. A method according to claim 3 including the steps of coding a contour of the rectangular area $H_i$ in a same fashion as a contour of the detail area $D_i$.

37. A method according to claim 3 including the steps of generating the contour code sequence KS in a same fashion as a position code sequence PS with substitution of rounding field parameters u and w by different values u' or w'.

38. A method according to claim 3 including the steps of providing a value code sequence WS which specifies values of detail elements and rectangular area $R_i$, providing a position code sequence PS which specifies contours of the halftone area $D_i$ for the position of the elementary elements in the rectangular area $D_i$, interlacing the sequences US, PS, WS, and KS such that m lines of US, n lines of PS, n.w lines of WS, and n.w/w' lines of KS follow one another, wherein w and w' are the reduction factors of a rounding of the rectangular area $D_i$ or of the halftone area $H_i$ in a vertical direction and n is an arbitrary whole number 1 with a restriction that v.m=n.w and n.w/w' is a whole number.

39. A method according to claim 10 including the steps of generating a detail criterion by outputting a value "True" or "False" dependent upon whether a "slope" of a mean luminance value YM(x,y) is greater or smaller than a threshold SW empirically determined, the "slope" being an approximation of an amount of a gradient of YM(x,y).

40. A method according to claim 39 including the step of defining an approximation of an amount of the gradient of YM(x,y) by a square root of a signal value $$q(x,y)=2x(A(x-c,y-c)-A(x+c,y+c))^2+2x(A(x-c,y+c)-A(x+c,y-c))^2+(A(x-d,y)-A(x+d,y))^2+A(X,y-d)-A(x,y+d))^2.$$

41. A method according to claim 10 including the step of generating an address from a selection of samples from an environment of a test point and supplying it to a data store, and taking a detail criterion valid for a respective sample combination from an addressed memory location of a data store.

42. A method according to claim 41 including the step of experimentally filling the data store by subjective evaluation of simulated patterns.

43. A method according to claim 41 including the step of filling the data store with a programmable function of participating samples.

44. A method according to claim 41 wherein the address is formed from luminance values of elementary elements located in an area whose size is at least once the size of a two-dimensional halftone raster.

45. A method according to claim 44 including the steps of generating a detail criterion such that a value "True" is output when a mean luminance of this area deviates both from both "white" as well as from "black" by less than an empirically determined value d, situating halftone raster spots interconnected to neighboring halftone raster spots of the same color in this area, and if the above conditions don't hold, outputting the value "False".

46. A method according to claim 3 including the steps of providing a value code sequence WS which specifies values of detail elements in rectangular area $R_i$, providing a position code sequence PS which specifies a position of detail elements in the rectangular area $R_i$, and summarily defining for the overall facsimile at least a part of parameters allocated to the code sequences US, PS, WS, and KS.

47. A method according to claim 46 wherein at least a portion of the parameters allocated to the code sequences US, PS, WS, and KS are transmitted in interlaced fashion with these code sequences.

48. A method according to claim 46 wherein at least a part of the parameters allocated to the code sequences US, PS, WS, and KS are transmitted before respective code sequences at a beginning of the facsimile.

49. A method according to claim 46 including the steps of transmitting specific ones of said parameters subsequent to a declared code word which identifies the type or significance of following parameters, and in case of absence of a declared code word, inserting a defined value for the corresponding parameter in accordance with a declaration.

50. A method according to claim 12 including the steps of determining the center points as well as generating and coding mean scan values for these center points for the entire rectangular area $R_i$ in which the halftone area $H_i$ to be respectively coded is situated.

51. A method according to claim 12 including the steps of determining the center points as well as generating and coding the mean scan values only for those center points needed for an interpolation during the reconstruction, and specifically for the center points situated in halftone area $H_i$ as well as for those center points situated outside of halftone area $H_i$ which are at a distance of less than h elementary elements from halftone area $H_i$ in a vertical or horizontal direction.

52. A method according to claim 31 including the step of deriving a rectangular area $R_i$ from a given primary rectangular area $R_i$ by rounding its contours to contours of rounding fields.

53. A method according to claim 52 including the step of not considering rounding fields not entirely contained in the primary rectangular area $R_i$ in the rounding.

54. A method according to claim 12 including the step of generating the mean scan values by a weighted averaging in accordance with the equation $$AM(x,y) = 4xA(x,y) + 2x((A(x-c,y-c) + A(x-c,y+c) + A(x+c,y-c) + A(x+c,y+c)) + A(x-d,y) + A(x,y-d) + A(x+d,y) + A(x,y+d)$$

wherein x and y are coordinates of the respective center point, $AM(x,y)$ is the mean scan value and a limited unsharp transformation $A'(x',y')$ of samples allocated to the elementary element and from an environment of a point $(x', y')$, and c and d are empirically determined parameters.

55. A method for coding a facsimile acquired when scanning an original, halftone areas $H_i$ resulting where i is a running number of a respective halftone area within the facsimile to be coded, comprising the steps of:
  executing a coding of the halftone areas corresponding to an unsharp imaging in comparison to the original such that a so-called halftone raster is suppressed to substantially reduce moire;
  defining a detail area $D_i$ within a respective halftone area $H_i$ and coding it with a detail code; and
  at least a remaining area of the halftone area $H_i$ being coded with an unsharp code.

* * * * *